United States Patent

Notley

[15] 3,661,589

[45] May 9, 1972

[54] INTERFACIAL VESICULAR PRINT MATERIALS AND METHODS OF PREPARATION

[72] Inventor: Norman T. Notley, P. O. Box 462, Sierra Madre, Calif. 91024

[22] Filed: Feb. 18, 1970

[21] Appl. No.: 12,468

[52] U.S. Cl. ....................96/91, 96/49, 117/34

[51] Int. Cl. ....................G03c 1/54

[58] Field of Search ....................96/49, 91, 75, 88, 67, 48, 96/115; 117/36.7, 36.8

[56] References Cited

UNITED STATES PATENTS

| | | | |
|---|---|---|---|
| 3,032,414 | 5/1962 | James et al. | 96/91 |
| 3,552,965 | 1/1971 | Notley et al. | 96/49 X |
| 3,532,500 | 10/1970 | Priest et al. | 96/75 X |
| 3,355,295 | 11/1967 | Priest | 96/49 X |
| 3,171,744 | 3/1965 | Peticolas | 96/48 X |
| 2,703,756 | 3/1955 | Herrick et al. | 96/49 |
| 3,091,532 | 5/1963 | Michaelsen | 96/115 X |
| 3,418,118 | 12/1968 | Thommes et al. | 96/35.1 X |
| 3,360,371 | 12/1967 | Munder et al. | 96/49 X |
| 3,202,510 | 8/1965 | Hollmann | 96/49 X |
| 3,272,629 | 9/1966 | Hills | 96/75 |

FOREIGN PATENTS OR APPLICATIONS

| | | | |
|---|---|---|---|
| 830,954 | 10/1960 | Great Britain | 96/49 |

*Primary Examiner*—Charles L. Bowers, Jr.

[57] ABSTRACT

This invention is directed to a method of preparing a light sensitive vesicular imaging film wherein two resin solutions, at the threshold of compatibility but having a common or miscible solvents, each containing a sensitizer which liberates gas on irradiation are mutually dispersed, coated as a thin film and dried. The thermoplastic film comprises an intimate dispersion of one hydrophobic resin in the other hydrophobic resin with the sensitizer essentially uniformly dispersed throughout. After irradiation with a pattern of actinic light, gas released in the selected areas may be developed by overall heating to a visible record. The vesicular image in this two phase hydrophobic composition is of particularly high density and thermal stability.

8 Claims, No Drawings

INTERFACIAL VESICULAR PRINT MATERIALS AND METHODS OF PREPARATION

It is an object of this invention to provide a method for preparing superior transparent and opaque vesicular print materials by forming a dispersed mixture of two incompatible hydrophobic resin solutions with the same or miscible solvents and a light sensitive agent most commonly a photosensitive diazonium compound uniformly dispersed throughout, coating it on a support such as polyester film or black paper and drying. As the resins dry down, one of the resins or one of the resins with a trace of the other tends to form the continuous phase encapsulating many small particles of the resin and it is generally although not necessarily found that the majority component polymer forms the continuous phase. This invention also relates to the resulting photosensitive vesicular print material in which a substantially clear hydrophobic resin layer has finely dispersed therein particles of a dissimilar hydrophobic resin, there being a light sensitive agent dispersed essentially uniformly through both resins.

When the film is exposed to actinic light the sensitizer releases molecules of a gas. The coating rheology is arranged so that these do not form vesicles immediately, both because print-out systems are less favored than latent image systems and because latent images may be reversal processed as will be discussed below. The released gas does form bubbles when the film is heated, preferably to a temperature between 90° C. and 170° C., presumably because the vehicle is relaxed sufficiently on heating for gas nuclei to expand. The resulting vesicles make the vehicle opaque to transmission of light in the exposed areas, but also reflective so that if the coating is made on an opaque substrate, the image appears white. Usually the resulting print is given an overall exposure to light to prevent possible undesirable bubble formation in the clear areas upon subsequent simultaneous exposure to heat and light as in a projector. Exposure and development of these vesicular imaging materials gives a positive copy from a negative or a negative from a positive. Reversal processing to produce a negative from a negative is discussed in the applicant's article entitled "Direct Image in Vesicular Photography" in Photographic Science and Engineering 10, (1), 3, 1966. The latent image is permitted to diffuse out of the film which is then exposed overall to actinic light and developed. As a transparency this processing provides a faithful reproduction of the original wherein parts of the copy which were exposed imagewise remain clear and the initially unexposed areas are processed to become opaque. The art is familiar with vesicular layers employing hydrophilic materials such as gelatin as the vehicle. These suffered from the difficulty that the vesicular images obtained faded rapidly. While gelatin and other water soluble polymers such as polyvinylalcohol or melamine-formaldehyde have the necessary low diffusion coefficient with respect to the blowing gas, they are unduly sensitive to water vapor. Such vehicles absorb moisture from the atmosphere and become soft, thus collapsing the vesicles and destroying the image. Improvements in this process were taught in U.S. Pat. No. 2,703,756 wherein the sensitizer containing colloid was encapsulated in a hydrophobic resin such as a vinylidene chloride copolymer. The essential image forming elements correspond exactly to the prior art but the said elements are sealed against short term upward fluctuations of the humidity. However, equilibration to a higher humidity still destroys the image. The hydrophobic resin itself may be the sole binder providing it satisfies a number of criteria which are very comprehensive and quite critical. While not confined to the following considerations, the criteria include very low permeability, good rigidity under ambient conditions, a convenient softening temperature at which the polymer is sufficiently fluid to permit vesicles to form but at which the gas permeability is still not excessively high, good solubility, good film forming characteristics, good adhesion to inert substrates and good binding for high concentrations of sensitizer. U. S. Pat. No. 3,032,414 taught the use of certain copolymers of vinylchloride and copolymers of vinylidene chloride but generally their practical utilization has required pre-nucleation treatments such as the water treatment described in U.S. Pat. No. 3,149,971. Other one phase binder systems for which the pre-nucleation is less important are taught in the applicant's copending U.S. application, Ser. No. 885,371 (filed Dec. 15 1969) and his copending U.S. application Ser. No. 5,350 (filed Jan. 23, 1970.) It has now been discovered that all of the advantages of a totally hydrophobic system can be retained, and the criticality of resin choice in the one phase hydrophobic system can be substantially reduced in a two phase binder system. The optimum structure of the present invention has one hydrophobic resin encapsulated within a continuous coating of another hydrophobic resin with the light sensitive gas generating material dispersed throughout the encapsulate and the encapsulating resin. The optimum amount of encapsulated resin must be determined for each composition, but exceeds 5 percent and generally does not exceed 50 percent of the total resin.

When two different resins are soluble in the same solvent and solutions are mixed, there may be compatibility or there may be separation as two phases. Illustrative of compatibility would be the addition of 1 part of a 20 percent solution of polymethylmethacrylate in butanone to 6 parts of a 20 percent solution of Saran[T.M] (Saran F120 from Dow Chemical Corp.) polyvinylidene chloride/acrylonitrile copolymer in the same solvent giving a one phase system in which both resins appear to maintain their molecular dispersion in the solvent and among each other. If the result of mixing is separation into two phases, then the separation may produce a resin or resins relatively free of solvent which would generally be described as precipitation or the separation may produce two liquid phases somewhat similar in solvent content but one being rich in one resin component and having little or none of the other resin component and this will be described as threshold incompatibility. In the practice of the present invention the threshold incompatibility is preferred. After the selection of the primary resin according to principles which will be discussed, it is relatively easy to select by trial and observation a second resin which will contribute to phase separation, and in most cases the threshold incompatibility prevails over a conveniently broad range. Thus if 2 parts of a 20 percent solution of polystyrene in butanone are mixed with one part of a 20 percent solution of Saran[T.M] in the same solvent incompatibility is quite high and coating quality is very poor. However, if the ratio of polystyrene to Saran[T.M] is between 1 to 1 and 1 to 6 or less then the solution is only slightly hazy and good coating quality can be achieved from an agitated solution. However, the threshold incompatibility is clearly evidenced on standing, when the dispersion separates into two layers, on very rich in polystyrene and the other rich in Saran[T.M].

A wide choice is possible for the encapsulating resin although generally the diffusion constant for nitrogen must be low enough that the time for half of the gas to be lost must be at least 30 seconds at 25° C. Although it is generally quite convenient to process the film in less than 30 seconds from the time of exposure, adhesion loss between the coating and a hard substrate such as polyester is generally found if the diffusion constant is higher. The diffusion constant is not a direct function of the more accessible permeability constant, but the diffusion constant is usually found to be satisfactory with the hydrophobic resins of present interest if the permeability is less than $10^{-11}$ and ($cm^3$ STP) cm/$(cm)^2$ (sec) (cm Hg). It should soften at a convenient operating temperature and preferably between 70° C. and 150° C. Particularly suitable encapsulating resins for the practice of the present invention include Saran[T.M], polyvinylacetals, copolymers of methacrylonitrile, and chloroacrylonitrile homopolymer and copolymers. The choice of encapsulated resin is similarly broad. It is generally preferred that it have a higher diffusion coefficient than the encapsulating resin, although it is actually only required to be different. It should have a refractive index not too different from the principal resin, although the haze is generally less than would be expected presumably because the resin separation is less than complete. With Saran$^{TM}$ as the encapsulating resin, good conditions for interfacial vesicular photography were obtained where the encapsulated resin was polystyrene, orth/para polychlorostyrene or cellulose acetate, with formaldehyde polyvinyl acetal as the encapsulating resin the encapsulated resin might be polystyrene or polyketone, with a methacrylonitrile-methylmethacrylate copolymer as the encapsulating resin a good encapsulate is saran or cellulose acetate and with a chloroacrylonitrile-styrene copolymer as the encapsulating resin a good encapsulate is polystyrene. Although for clarity of discussion each of the resin phases has been described as a definite species of homopolymer or copolymer, it is possible for either one to be itself a compatible mixture. Thus polystyrene may be encapsulated in a mixture of Saran$^{TM}$ and polymethylmethacrylate. Any convenient solvent or solvent mixture may be used although generally butanone, dimethylformamide or dioxane have been preferred. The sensitizer may be added in a milling type operation although the requirement that it be mixed intimately through both resin phases is generally better met if it is mixed in from a compatible solvent such as valerolactone, butyrolactone or acetonitrile. While the specific choice of a sensitizer to liberate gas upon irradiation is not a subject of this invention, it is noted that those which liberate nitrogen are particularly effective including the diazonium salts such as dimethylaminobenzene diazonium chloride, 4 morpholino benzene diazonium chloride, or diethylaminobenzene diazonium chloride. The addition of acids such as citric acid or paratoluenesulfonic acid is not injurious in materials of the present invention. Prior art also teaches the addition of inert light absorbing dyes which will enhance the vesicular image contrast with only a relatively slight increase in background density. The film support can be any suitable material. If the image bearing record is to be used as a transparency then biaxially oriented polyethylene glycol terephthalate (i.e., Melinex, Mylar, or Celenar polyester), glass, polyethylene or polypropylene may be used directly, cellulose acetate may be used if it is coated with an interlayer to prevent diffusion of plasticizer from the base into the vesicular image bearing layer and a polycarbonate such as Lexan or oriented polystyrene if there is an interlayer to prevent attack on the base by the solvents used in the coating. Opaque support material may be used where the image is to e viewed by reflection and should be dark in color or black for maximum contrast with the developed vesicles which appear white in reflection. Such materials include metal foil, pigmented plastics or paper. The coating solution will generally be applied to the support material in a gravure or reverse roll coating operation in sufficient amount to give a dried down film between 2 and 100 microns in thickness. The time and temperature of drying will be adjusted to secure essentially complete removal of solvent and tendency to blister on subsequent application of the development temperature, but to avoid excessive thermal decomposition of the sensitizer. Approximate temperatures are generally between 70° C. and 150° C.

Various types of pre-nucleation are known and may be applied to compositions of the present invention to achieve slight enhancement of the photographic speed or exposure range. However, the results are not as spectacular as with materials of the prior art since a truly effective internal nucleation has already been achieved in the present coatings. The aforementioned pre-nucleation processes include preflashing with actinic light with or without heating, dry heat alone, or heating in water.

Films of the present invention show higher image to non-image vesicular contrast than is obtained with hydrophobic one phase coatings of the prior art, and generally the vesicles are more stable under stress conditions. Further very important advantages follow from this. Compared with the one phase coatings these films are more readily copied, they have a lower Callier factor which makes projection uses more compatible with contact printing, and they have the add-on capability much desired in microfiche use. Films of the present invention differ from both hydrophilic one phase coatings and from hydrophilic-hydrophobic two phase coatings of the prior art particularly in image stability which is essentially infinite under normal conditions. In order to understand more clearly the practice and the advantages of interfacial vesicular imaging, some preferred specific embodiments are described in detail.

SPECIFIC EMBODIMENTS

EXAMPLE 1

25 grams of a 20 percent solution of a polystyrene of molecular weight 22,000 in butanone were mixed with 150 grams of a 20 percent solution of vinylidene chloride acrylonitrile copolymer (Saran F120, from Dow Chemical Corp.) in butanone and sufficient dimethylaminobenzene diazonium chloride zinc chloride salt was added as a 10 percent solution in butarolactone to provide a 10 percent loading of sensitizer on a dry weigh basis. The two phase solution was gently agitated during coating from a 4 mil nip onto a web of transparent polyester film. The coating was dried for 10 minutes in a current of air at a temperature increasing to 115° C. After exposure for 80 seconds to a Matsushita printing tube FL10BA-37, and development at 120° C. for one-half second, the vesicular density was 0.55 net above background. This compared with a density of only 0.35 for a one phase sensitized coating with the Saran or zero for a one phase sensitized coating with polystyrene. It is apparent that the domains of polystyrene as well as the domains of Saran carry sensitizer. While the mechanism of the superior activity in compositions of the present invention is not fully understood and is not intended to limit the invention, it is believed that gas generated in the more permeable domains of the image area (the polystyrene domains in the Example 1) escapes to the interface with the less permeable resin, there producing locally high stress and particular facility to nucleate and expand the desired vesicles. It is further believed that the vesicle tends to envelop to some extent the more permeable domain, thereby becoming an effectively larger deformation in the film and offer a correspondingly higher interruption to the transmission of light. Thus in the Example 1, there was a 60 percent increase in the density.

EXAMPLE 2

Polymethylmethacrylate was substituted, weight for weight, for polystyrene in the formulation of Example 1. It was noted that polymethylmethacrylate and Saran$^{TM}$ were compatible, showing no tendency to separate. The maximum obtainable vesicular density was reduced to 0.31 which is less than the density of an unmodified Saran$^{TM}$, not withstanding that the film had essentially the same permeability as the two phase film of Example 1. Furthermore the stability of an image in the one phase binder was much less than in the two phase system. Holding an image of Example 2 for 40 minutes at 73° C. the contrast of 0.31 diminished progressively to 0.11 whereas the image of Example 1 was essentially unaffected.

EXAMPLE 3

100 grams of formaldehyde polyvinyl acetal ( available under the tradename Formvar 12–85) were dissolved to 20 percent in dioxane and mixed with 17 grams of a polyketone (Union Carbide Polyketone 251) dissolved to 20 percent in butanone. The polymers were incompatible, but with gentle agitation of the solutions, 10 percent of the diazo sensitizer could be added and a good coating obtained as in Example 1. A diffuse image density of 0.26 was obtained, whereas only 0.09 was obtained with the unmodified acetal.

EXAMPLE 4

100 parts of a copolymer between alpha chloroacrylonitrile and styrene and 33 parts of polystyrene were mixed as 20 percent solutions in butanone, sensitized with 10 percent of diazonium salt and maintained by gentle stirring in sufficiently intimate mixture for coating as in Example 1. There was substantial increase in the obtainable density compared with a one phase sensitized coating of the alphachloroacrylonitrile-styrene copolymer.

EXAMPLE 5

200 parts of a methacrylonitrile copolymer (5 percent methylmethacrylate) were mixed with 100 parts Saran$^{TM}$ each being a 20 percent solution in dimethylformamide. The incompatible solutions were maintained relatively homogeneous by gently stirring and coated as in Example 1 with 10 percent sensitizer from a 4 mil nip. The diffuse density was 0.30 compared with only 0.12 for the unmodified methacrylonitrile copolymer. The present disclosure is for the purpose of illustration only and this invention includes all modifications and equivalents which fall within the scope of the appended claims.

What is claimed is:

1. A method of preparing a photographic material capable of furnishing a record solely in the form of a pattern of vesicles, said material being in the form of a thermoplastic hydrophobic film which softens between 70° C. and 150° C. and comprising an intimate encapsulate of one hydrophobic resin having a threshold incompatibility relationship in a continuum of an encapsulating dissimilar hydrophobic resin and a photosensitive diazonium salt substantially uniformly dispersed through both resins, said encapsulating resin having a permeability for nitrogen less than $10^{-11}$ ($cm^3$STP) (cm)/($cm^2$) (sec) (cm Hg) $(cm\ Hg)^{-1}$ at 25° C. and being chosen from the group consisting of vinylidene chloride/acrylonitrile copolymers, polyvinylformal, methacrylonitrile homopolymer, methacrylonitrile/methylmethacrylate copolymers, chloroacrylonitrile alpha homopolymers, vinyl chloride homopolymer and copolymers of chloroacrylonitrile and of vinyl chloride with a different vinyl monomer which is present to the extent of less than 50 mole percent of the copolymer and said encapsulated resin is present to the extent of more than 5 percent but less than 50 percent of the total resins, said method comprising the steps of combining two mutually incompatible polymer solutions having the same or mutually miscible non-aqueous solvents together with the photosensitive diazonium salt in the same or a miscible non-aqueous solvent, coating the mixture on a support and drying.

2. The process of claim 1 wherein the encapsulating resin component is essentially a copolymer of vinylidene chloride and acrylonitrile.

3. The process of claim 1 wherein the encapsulating resin component 6 parts by weight of a copolymer of vinylidene chloride and acrylonitrile and the encapsulated resin component is 1 part by weight of polystyrene.

4. The process of claim 1 wherein the incompatible polymer solutions are 3 parts of vinylidene chloride-acrylonitrile copolymer dissolved in butanone and 1 part of polystyrene dissolved in butanone and the photosensitive diazonium salt is dissolved in butyrolactone.

5. The process of claim 1 wherein the encapsulating resin component is essentially a polyvinylformal and the encapsulated resin component is essentially a polyketone resin.

6. The process of claim 1 wherein the encapsulating resin component is a methacrylonitrile copolymer and the encapsulated resin component is a vinylidene chloride-acrylonitrile copolymer.

7. A photographic material made by the process of claim 1 and capable of furnishing a record solely in the form of a pattern of vesicles, said material being in the form of a thermoplastic hydrophobic film which softens between 70° C. and 150° C. and comprising an intimate encapsulate of one hydrophobic resin having a threshold incompatibility relationship in a continuum of an encapsulating dissimilar hydrophobic resin and a diazonium compound capable of generating nitrogen upon exposure to radiation substantially uniformly dispersed through both resins, said agent upon exposure to light decomposing into products which solely upon warming are volatile to form vesicles only in the light struck areas to furnish thereby said record, said encapsulating resin having a permeability for nitrogen less than $10^{-11}$ ($cm^3$STP) (cm)/($cm^2$) (sec) (cm Hg) $(cm\ Hg)^{-1}$ at 25° C. and being chosen from the group consisting of vinylidene chloride/acrylonitrile copolymers, polyvinylformal, methacrylonitrile homopolymer, methacrylonitrile/methylmethacrylate copolymers, chloroacrylonitrile alpha homopolymers, vinyl chloride homopolymer and copolymers of chloroacrylonitrile and of vinyl chloride with a different vinyl monomer which is present to the extent of less than 50 mole percent of the copolymer and said encapsulated resin is present to the extent of more than 5 percent but less than 50 percent of the total resins.

8. A material according to claim 7 wherein the encapsulating resin component is essentially a copolymer of vinylidene chloride and acrylonitrile and the encapsulated resin component is essentially polystyrene.

* * * * *